(12) United States Patent
Musyoka et al.

(10) Patent No.: US 9,522,828 B2
(45) Date of Patent: Dec. 20, 2016

(54) ULTRASONIC SYNTHESIS OF ZEOLITES FROM FLY ASH

(75) Inventors: Nicholas Mulei Musyoka, Cape Town (ZA); Leslie Petrik, Cape Town (ZA); Erich Hums, Hessdorf (DE)

(73) Assignees: Eskom Holdings SOC Limited, Johannesburg (ZA); University of the Western Cape, Cape Town (ZA)

( * ) Notice: Subject to any disclaimer, the term of this patent is extended or adjusted under 35 U.S.C. 154(b) by 357 days.

(21) Appl. No.: 14/238,146

(22) PCT Filed: Aug. 8, 2012

(86) PCT No.: PCT/IB2012/054035
§ 371 (c)(1),
(2), (4) Date: May 19, 2014

(87) PCT Pub. No.: WO2013/021351
PCT Pub. Date: Feb. 14, 2013

(65) Prior Publication Data
US 2014/0255297 A1     Sep. 11, 2014

(30) Foreign Application Priority Data

Aug. 10, 2011  (GB) .................................. 1113768.4

(51) Int. Cl.
*C01B 39/02*     (2006.01)
*C01B 37/02*     (2006.01)

(52) U.S. Cl.
CPC ............... *C01B 39/02* (2013.01); *C01B 37/02* (2013.01)

(58) Field of Classification Search
CPC .................................. C01B 39/02; C01B 37/02
See application file for complete search history.

(56) References Cited

FOREIGN PATENT DOCUMENTS

FR     2843744 A1     2/2004

OTHER PUBLICATIONS

Ghosal, Sarbajit, Jon L. Ebert, and Sidney A. Self. "Chemical Composition and Size Distributions for Fly Ashes." Preprints of Papers—American Chemical Society Division Fuel Chemistry 38 (1993): 1195-1202.*
Accession No. 9744135, Dong-qiang, Xing et al., "Study on the synthesis of fine particle 4A zeolite at ultrasonic condition," Journal of Hebei Normal University (Natural Science Edition), vol. 31(4):484-487 (2007), 1 page (2007).
STN Accession No. 134:224742, "Metod and apparatus for manufacture of synthetic zeolites," 3 pages (2001).
STN Accession No. 136:71906, Matsumoto, Taiji et al., "Zeolite synthesis from fly ash," Tochigi-ken Ken'nan SHidosho, vol. 14:52-55 (2000), 1 page (2002).
Thomson Accession No. 2001-608440, 2 pages (2001).
Thomson Accession No. 2008-J32761, 2 pages (2008).
Kim, Wantae et al., "Sonochemical Synthesis of Zeolite A from Metakaolinite in NaOH Solution," Materials Transactions, vol. 51(9):1694-1698 (2010).
International Search Report for Application No. PCT/IB2012/054035, 4 pages, dated Dec. 14, 2012.

* cited by examiner

*Primary Examiner* — David M Brunsman
(74) *Attorney, Agent, or Firm* — Nelson Mullins Riley & Scarborough LLP; Anthony A. Laurentano

(57) ABSTRACT

A method for the preparation of zeolites from non-fused fly ash includes the steps of preparing an aqueous alkali hydroxyl solution and mixing the solution with the non-fused fly ash to create an aqueous alkali hydroxyl fly ash mixture, subjecting the mixture to ultrasonication and recovering the zeolites. The method may include the step of centrifuging the aqueous alkali hydroxyl fly ash mixture and washing the solid synthetic products (zeolites).

13 Claims, 15 Drawing Sheets

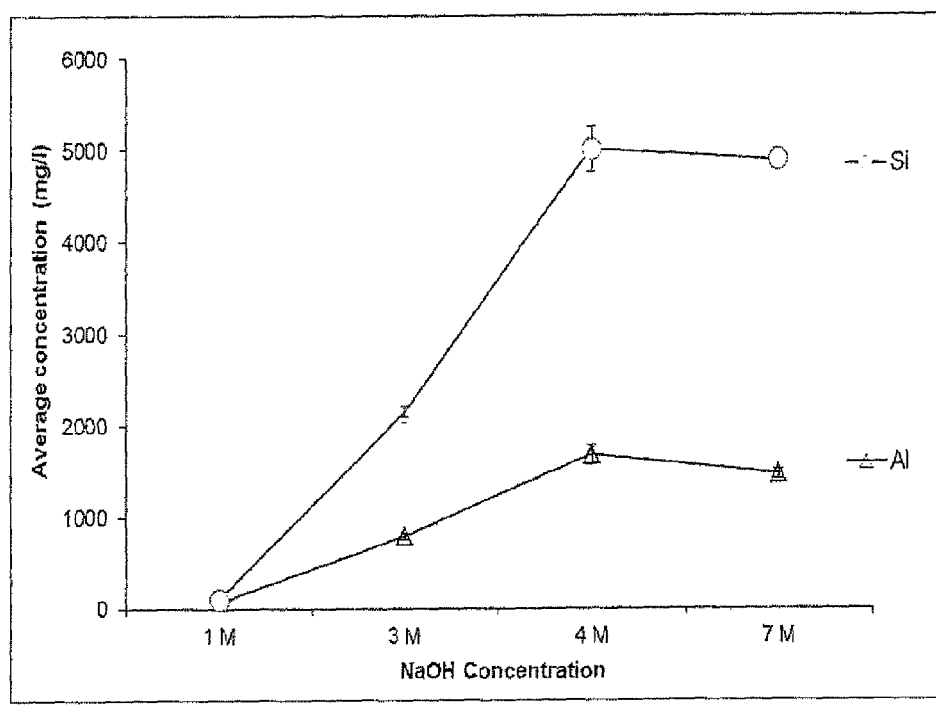
Figure 1: Effect of NaOH concentration on dissolution behaviour of Si and Al from the as-received fly ash after sonication for 10 minutes.

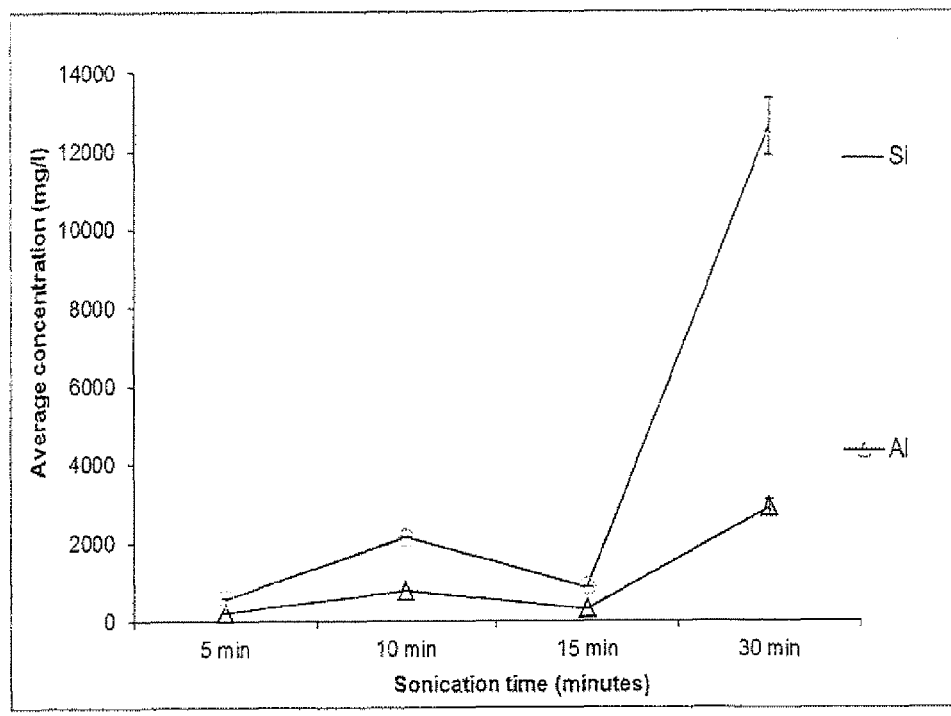
Figure 2: Effect of sonication time (5, 10, 15 and 30 min) on dissolution behaviour of Si and Al from the as-received fly ash; NaOH concentration was held at 5 M.

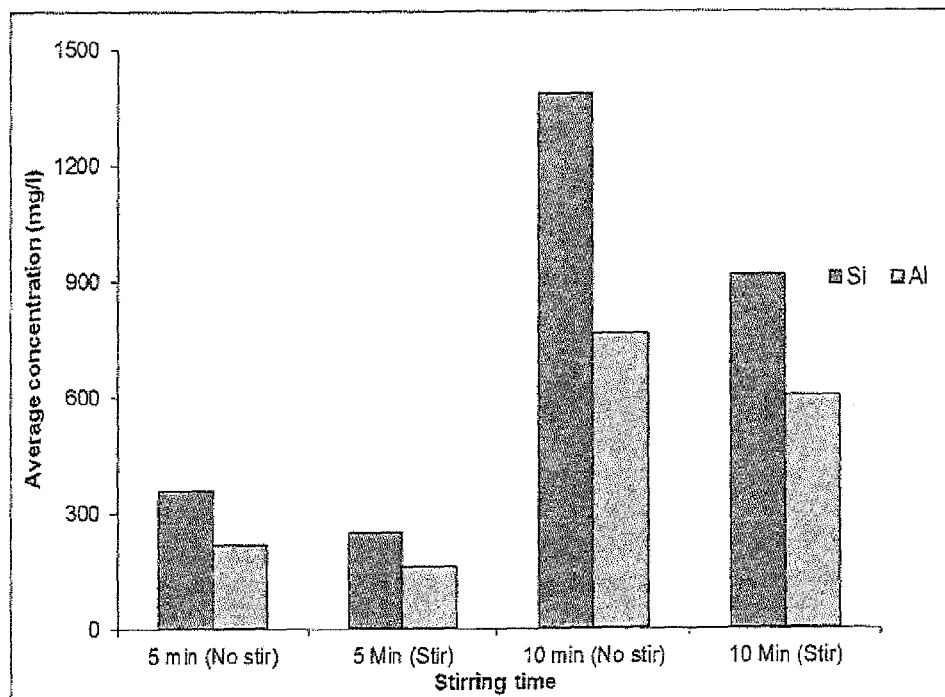
Figure 3: Effect of magnetic stirring during sonication fly ash-NaOH slurry on the dissolution behaviour of Si and Al from the as-received fly ash; mixture was sonicated for 10 minutes and NaOH concentration was held at 5 M.

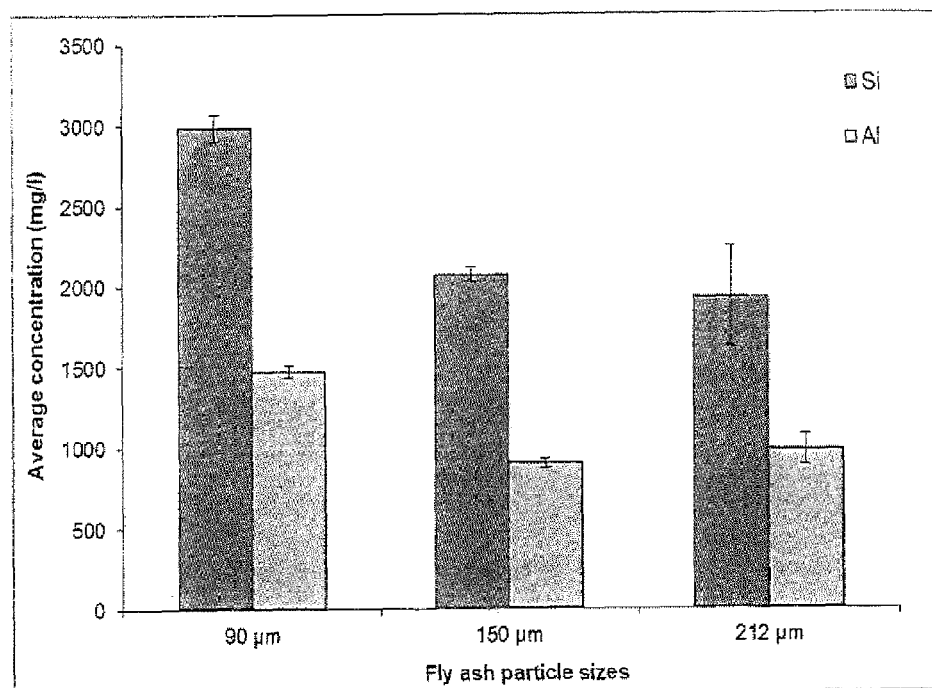
Figure 4: Effect of fly ash particle size on dissolution behaviour of Si and Al from the as-received fly ash after sonication for 10 minutes with NaOH concentration kept constant at 5 M.

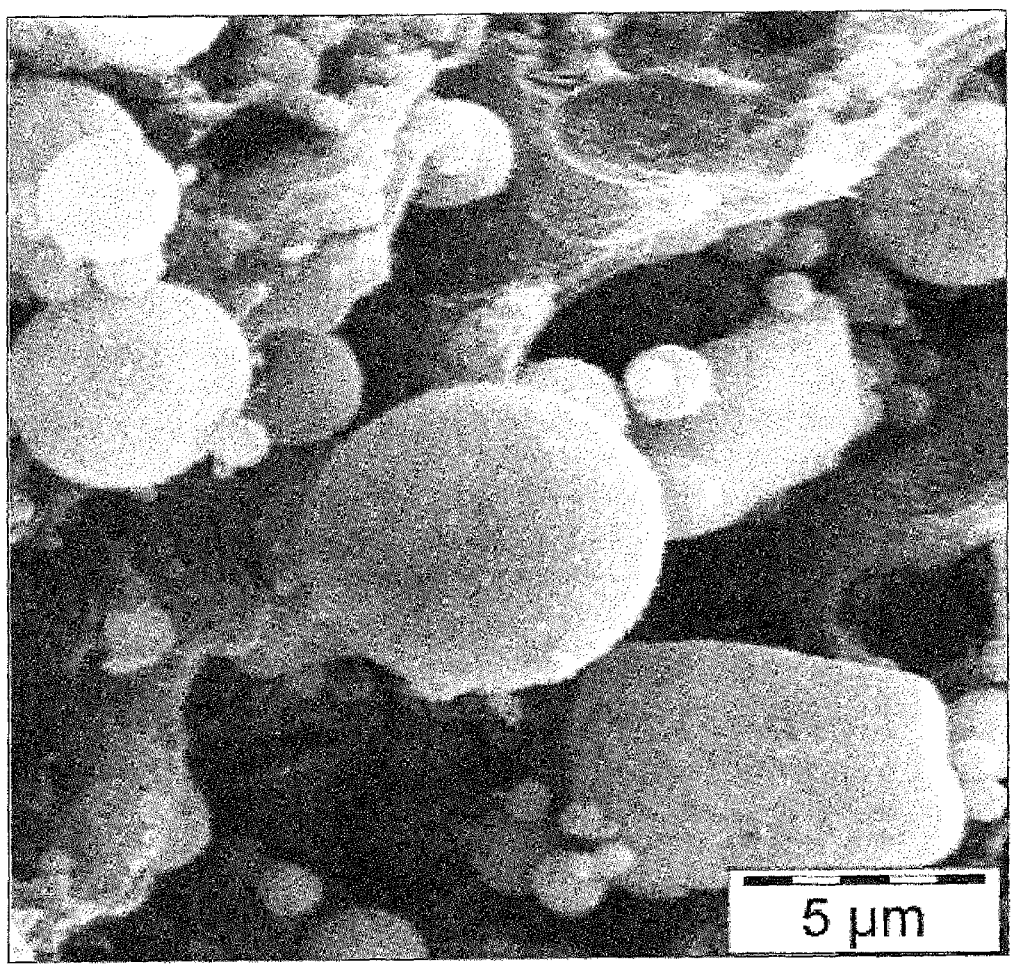
Figure 5: SEM images of the raw (as-received) fly ash.

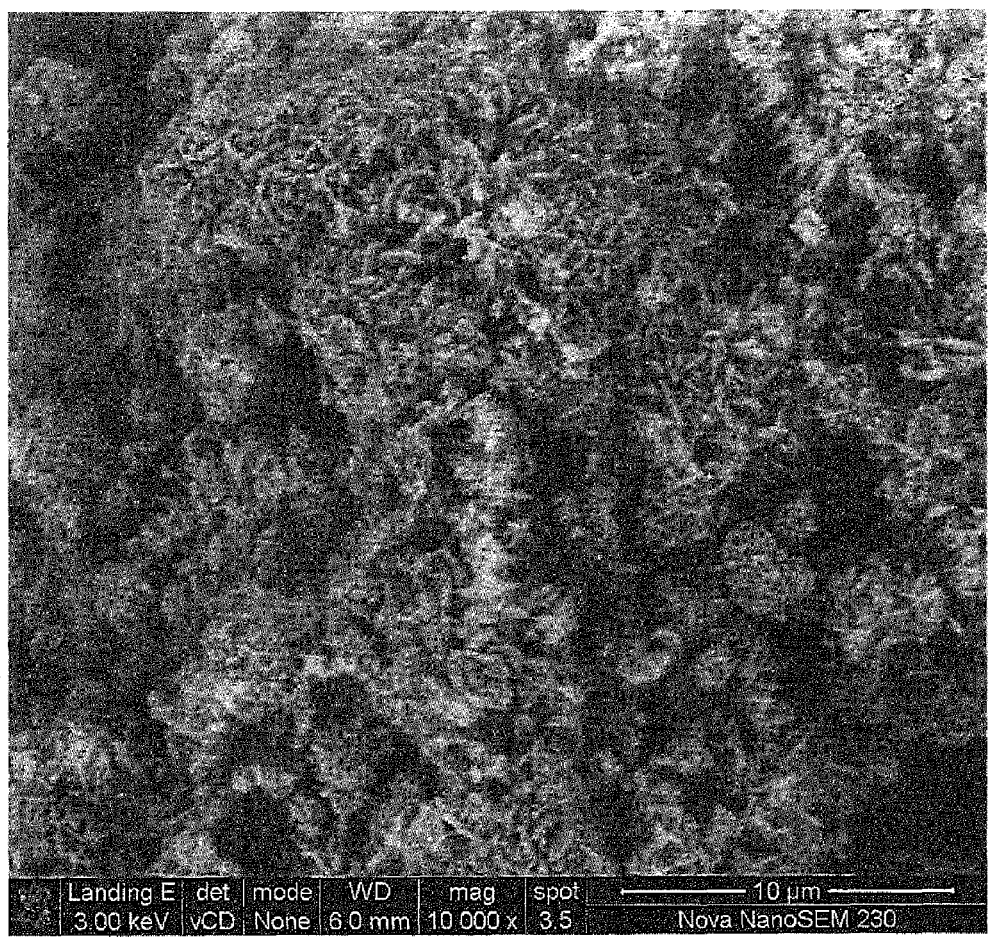
Figure 6: SEM images of synthesis product obtained when the as-received fly ash was sonicated for 5 minutes.

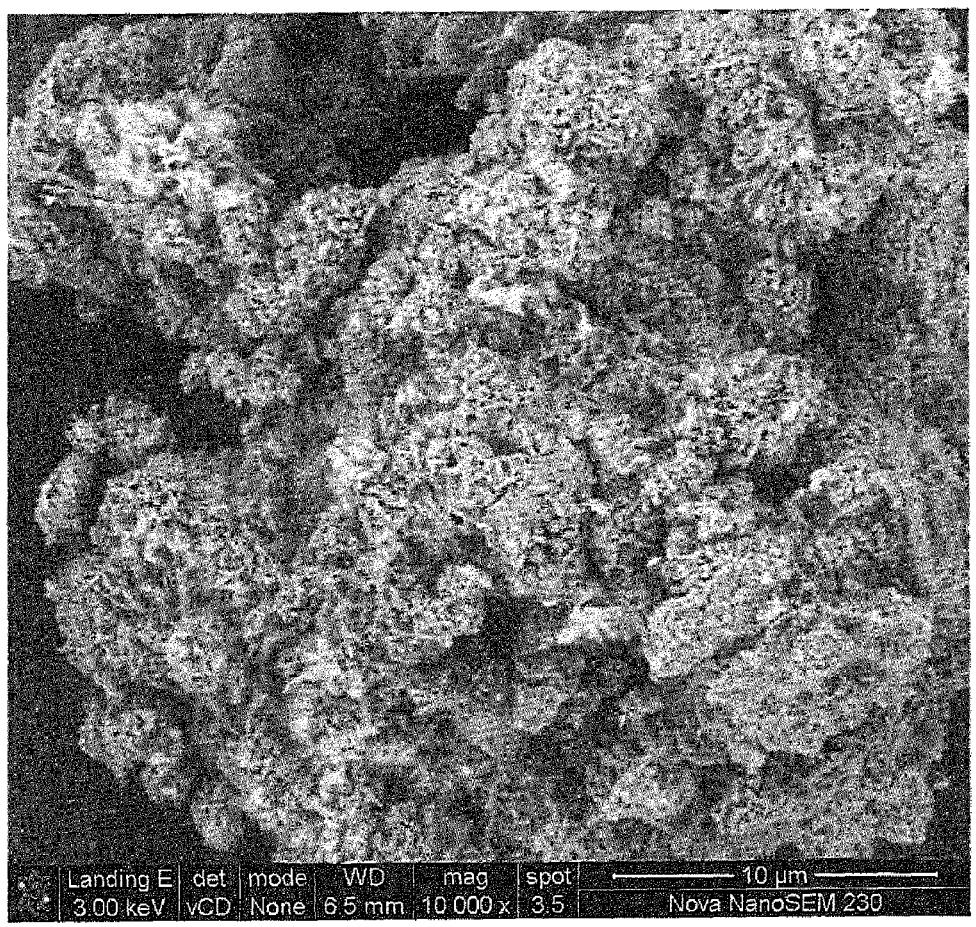
Figure 7: SEM images of synthesis product obtained when the as-received fly ash was sonicated for 10 minutes.

Figure 8: SEM images of synthesis product obtained when the as-received fly ash was sonicated for 15 minutes.

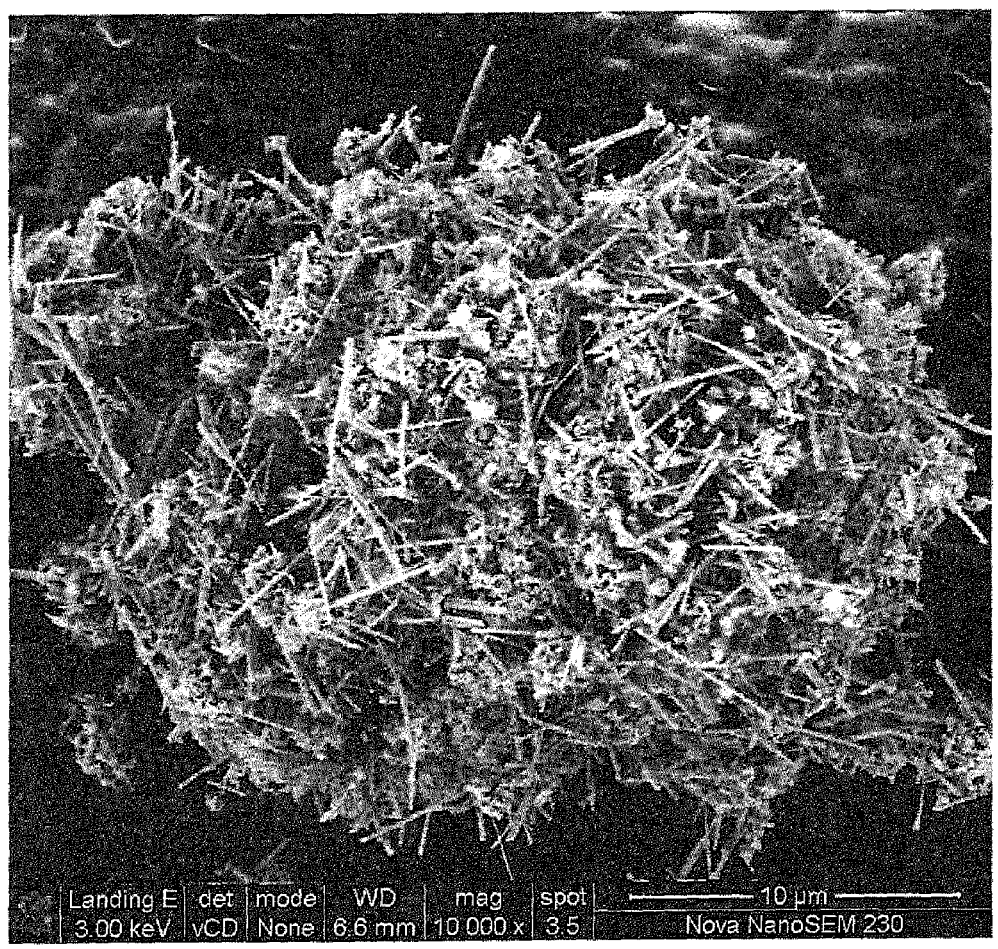
Figure 9: SEM images of synthesis product obtained when the as-received fly ash was sonicated for 30 minutes as presented.

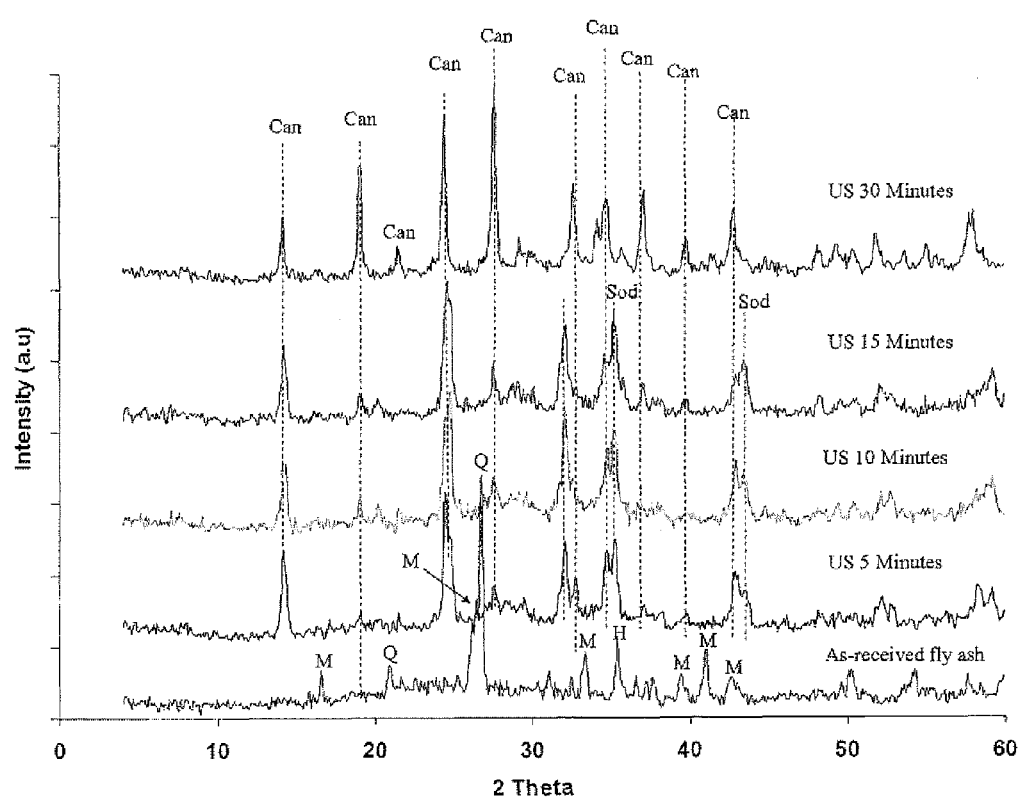
Figure 10: X-ray diffraction pattern of raw fly ash compared with ultrasonic assisted synthesis products obtained by variation of sonication time from 5 to 30 minutes (Can = hydroxyl cancrinite, Sod = hydroxyl sodalite, Q = quartz, M = Mullite, H = Hematite).

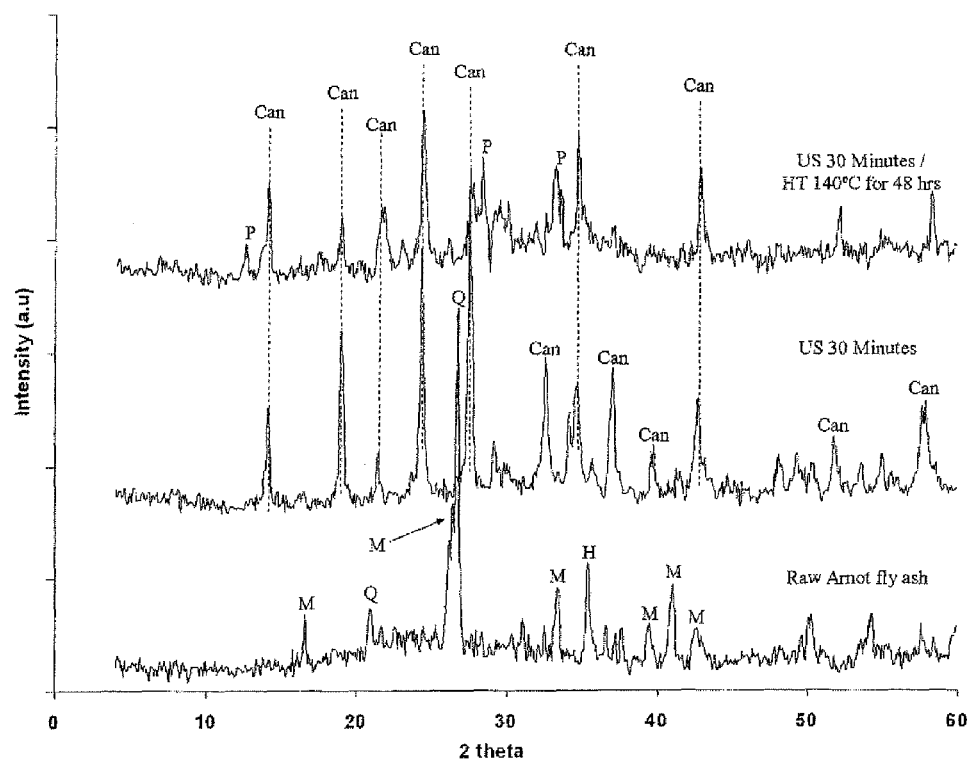
Figure 11: X-ray diffraction pattern of raw (as-received) fly ash compared with the 30 minutes sonicated fly ash and hydrothermally (HT) treated (after 30 minutes of sonication) fly ash slurry (Can = hydroxyl cancrinite, P = zeolite Na-P1, Q = quartz, M = Mullite, H = Hematite).

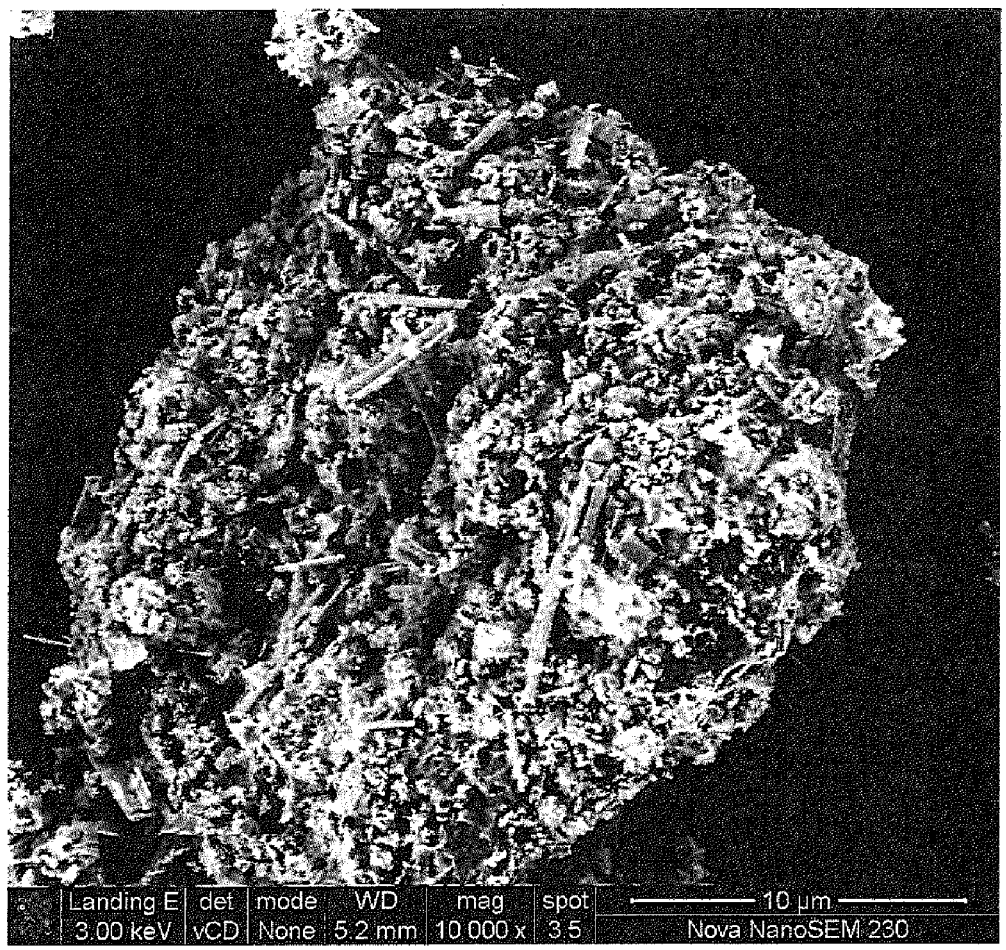
Figure 12: SEM image of the synthesis product obtained when the already sonicated (30 minutes) as-received fly ash that was shown in Figure 9 was further subjected to hydrothermal treatment at 140 °C for 48 hours.

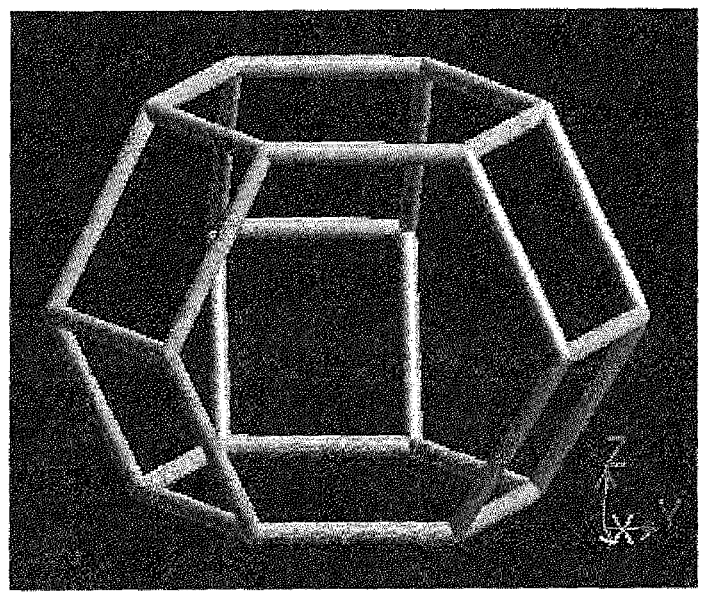
Figure 13: Image showing a cancrinite cage (reference, IZA, 2010).
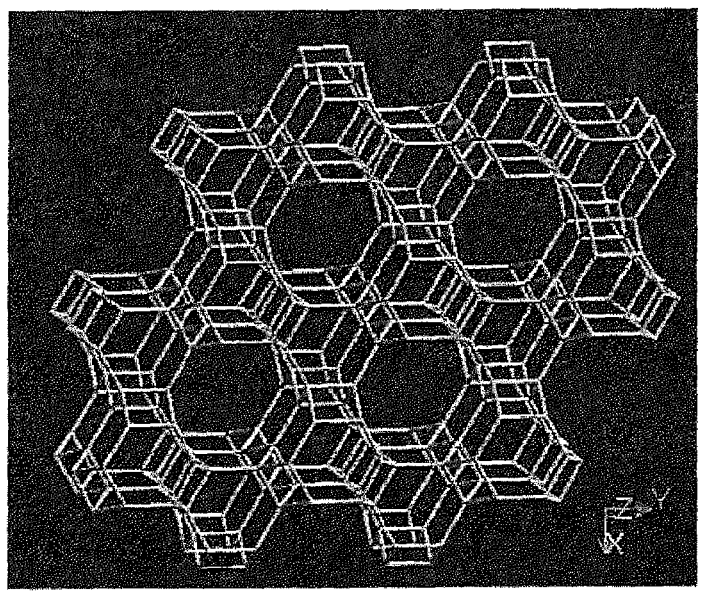
Figure 14: Structure projections of cancrinite zeolite seen at [001] (reference, IZA, 2010).

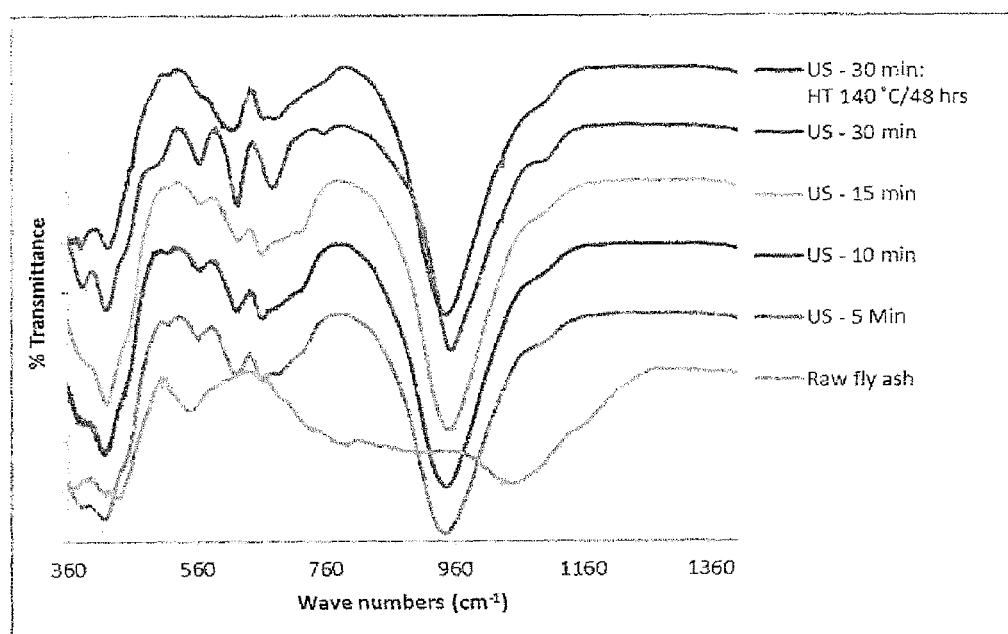
Figure 15: Comparative FTIR spectra generated when the raw (as-received) fly ash was sonicated at different times (5, 10, 15 and 30 minutes) together with that generated when the already sonicated (30 minutes) fly ash was further subjected to hydrothermal treatment (HT) at 140 °C for 48 hours.

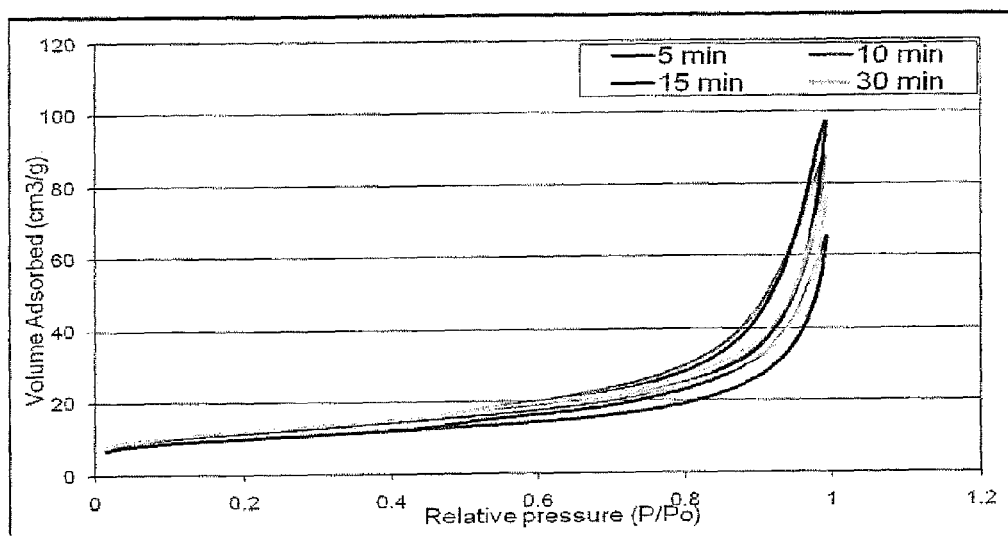
Figure 16: N2 adsorption – desorption isotherm for zeolitic product synthesised by varying the sonication time (5 – 30 minutes).

US 9,522,828 B2

ULTRASONIC SYNTHESIS OF ZEOLITES FROM FLY ASH

RELATED APPLICATIONS

This application is a 35 U.S.C. 371 national stage filing of International Application PCT/IB2012/054035, filed Aug. 8, 2012, which claims priority to Great Britain Patent Application No. 1113768.4 filed on Aug. 10, 2011 in Great Britain. The contents of the aforementioned application s are hereby incorporated by reference.

INTRODUCTION

The invention relates to a method for the preparation of zeolites from non-fused fly ash by direct application of ultrasound without the need for the classic conventional hydrothermal process.

BACKGROUND

Ultrasonication enables achievement of reactions under normal conditions, which otherwise would require harsh reaction conditions (Ashokkumar et al., 2007). Ultrasound consists of pressure waves exceeding 18 kHz (Mason, 1997). Imparting this energy to a solution leads to acoustic cavitations (bubble formation) and subsequent implosion. The acoustic cavitation provides a unique interaction of energy and matter and is the foundation of sonochemisty and sonoluminesense (Suslick, 1998). Extremely high local temperature and pressure gradients are generated upon the collapse of the bubble. The estimated hotspot temperature and pressure has been found to be around 5000° C. and 1000 atm respectively (Mason, 1997; Suslick, 1998; Run et al., 2004). The heat generated is normally dissipated with no appreciable change in the environmental conditions and the cooling after the collapse of the cavitation bubbles is estimated to be around 10 billion ° C. per second (Dolores et al., 2007). Ultrasonic irradiation causes physicochemical effects in solid, liquid or even air (Enomoto et al., 1996) and has been reported to induce a stirring effect in a solution due to the microjetting and microstreaming of the collapsed bubbles (Lindley, 1992).

The sonochemical effects have been shown to have many different applications in research. For example; acceleration of the reaction in polymer synthesis due to formation of reactive intermediates (Michel, 2001), sample digestion (Priego-Capote and Luque de Castro, 2007a), synthesis of nano- and micro-particles (Lindley, 1992), intercalation and impregnation of nanoparticles to supports such as clays (Belova et al., 2009) and sonocrystallisation (Mason, 1997; Luque de Castro and Priego-Capote, 2007b). During the ultrasonic assisted sample digestion, the main advantages over other methods are the speed of digestion and high sample treatment capacity (Levilla et al., 2006). It also helps to prevent the loss of volatile elements such as, As, Se, and Hg (Aki and Ari, 2007).

Ultrasonic enhanced crystallization is not a new process and has been in use for many years (Lindley, 1992). Sonocrystallization accelerates nucleation and crystallization rates (Dolores et al., 2007, Luque de Castro and Priego-Capote, 2007b) and hence leads to improvement of the yield and particle size distribution. During ultrasonic assisted zeolite synthesis, ultrasound has been shown to increase the solubility of the feedstock into the mother liquor, influencing the depolymerisation and polymerisation kinetics, and also aiding in the crystallisation process (Jianmei et al., 2006). Although the mechanism of zeolite formation by the use of ultrasound is not well understood, Lindley (1992) proposed that during the expansion stage of the cavitation bubble there is localized cooling which in turn leads to localised increase in the degree of supersaturation that trigger the formation of a germ nuclei that is distributed through the solution upon the collapse of the bubble which later grows to form the crystalline material. This proposal is also backed by Luque de Castro and Priego-Capote (2007b).

Studies conducted by Feng et at (2004) showed that dissolution of fly ash and metakaolin was enhanced by the application of ultrasound. Studies of effects of ultrasound on synthesis of zeolite A conducted by Özlem et al. (2005) concluded that it was possible to obtain highly crystalline zeolite A from pure industrial chemicals on application of ultrasound.

Although ultrasonic enhanced crystallization as shown above is not a new process, there is no evidence in the literature reporting synthesis of zeolites by direct sonication of non-fused coal fly ash. Prior studies as reported by Belviso et al. (2011) describe indirect ultrasonication of fused fly ash prior to conventional hydrothermal treatment.

A need exists to address the shortcomings of the popular hydrothermal synthetic approaches by minimising high consumption of energy and prolonged synthesis time. In particular, a need exists to not use a separate hydrothermal process based on ultrasonic treatment

SUMMARY OF INVENTION

According to the present invention there is provided a method for the preparation of zeolites from non-fused fly ash, the method including the steps of preparing an aqueous alkali hydroxyl solution and mixing the solution with the non-fused fly ash to create an aqueous alkali hydroxyl fly ash mixture, subjecting the mixture to ultrasonication and recovering the zeolites.

In this specification, reference to fly ash is a reference to non-fused fly ash, unless otherwise stated. The term "as-received fly ash" is considered interchangeable with the term "raw fly ash". Fused fly ash is fly ash which has been mixed with an aqueous alkali hydroxyl solution (for example, NaOH) optionally ground and then heated to at least 300 degrees Centigrade, possibly 400 deg C., possibly 500 deg C. and more for approximately at least one hour.

In one embodiment of the present invention the mixture is not exposed to hydrothermal conditions required for the synthesis of zeolite from fly ash.

It will be appreciated that the method as hereinbefore described may give rise to a solution and synthesised zeolite.

The method may include the step of centrifuging the aqueous alkali hydroxyl fly ash mixture and thereafter optionally filtering the mixture in order to remove any remainder of the undissolved fly ash in the supernatant solution.

The method may further include the step of washing solid synthetic products (zeolites), preferably with ultra pure water, to remove loosely-bound surface alkalis. Thereafter the solids may be dried in an oven, for example at 90° C., to reduce adsorbed moisture.

Preferably the method takes place at atmospheric pressure and room temperature (20-25 deg C.).

The aqueous alkali hydroxyl concentration of the aqueous alkali hydroxyl solution mixed with the fly ash feedstock is preferably from 0.5 to 10M (molar). Most preferably the aqueous alkali hydroxyl concentration of the solution is selected from 1M, 3M, 4M and 7M. The aqueous alkali hydroxyl solution is preferably an aqueous sodium hydroxide solution but it will be appreciated that any aqueous alkali hydroxyl solution may be used.

The aqueous alkali hydroxyl solution may include tap water, distilled water, deionised water, brine and/or mine water. The aqueous alkali hydroxyl fly ash mixture may take the form of a slurry. The solid to liquid mass ratio of fly ash to aqueous alkali hydroxyl solution may be from 1:1 to 1:20. Preferably the ratio is from 1:2 to 1:7.5, most preferably 1:5.

The mixture may be subject to ultrasonication for between 2 and 45 minutes. Preferably the mixture is subject to ultrasonication for 5, 10, 15 or 30 minutes. In one embodiment the mixture is subject to direct ultrasonication. Direct ultrasonication is where the sonicator is placed directly into the mixture and the ultrasonication is not transmitted through a different media, for example, by way of a water bath.

The mixture may be stirred or agitated for a least a portion of the time whilst being subject to ultrasonication and/or after being subject to ultrasonication.

Preferably the fly ash has an aggregate particle size of between 50 and 300 μm (micrometers). Preferably the aggregate particle size is selected from 90 μm, 150 μm and 212 μm.

Preferably the ultrasonication is applied directly to the aqueous alkali hydroxide fly ash mixture. The temperature was noted to increase proportionally with sonication time and the highest was observed to be 90 deg C. (° C.) after 30 minutes of sonication.

In one embodiment of the invention, following centrifugation, a resultant supernatant is filtered off and subjected to further crystallization.

Preferably the utrasonication is more than 400 Watts of power, more preferably more than 500 Watts. Preferably the ultrasonication is less than 16 kilo Watts of power.

In one embodiment of the present invention there is provided a method for the preparation of zeolites from non-fused fly ash, the method consisting essentially of the steps of preparing an aqueous alkali hydroxyl solution, mixing the solution with non-fused fly ash and subjecting the resultant mixture to ultrasonication.

In this specification zeolite means an aluminosilicate with an open three dimensional crystal structure in which water molecules can be held in the cavities in the lattice. The water can be driven off by heating and the zeolite can then absorb other molecules of suitable size.

In this specification fly ash means the residues (ash) generated in combustion of coal and comprises the fine particles that rise with the flue gases. Depending upon the source and makeup of the coal being burned, the components of fly ash vary considerably, but all fly ash includes substantial amounts of silicon dioxide ($SiO_2$) (both amorphous and crystalline) and $Al_2O_3$ as well as calcium oxide (CaO), these elements being endemic ingredients in many coal-bearing rock strata.

The Si and Al is essential for zeolite formation and their ratio is crucial for specific zeolites to form—whereas Ca is not essential as long as there is Na in hydroxide solution.

Two classes of fly ash are defined by ASTM 0618: Class F fly ash and Class C fly ash. The main difference between these classes is the amount of calcium, silica, alumina, and iron content in the ash. The chemical properties of the fly ash are largely influenced by the chemical content of the coal burned. In this specification, the term fly ash refers to both Class F and Class C fly ash.

In this specification ultrasonication (or sonication/sonicated) means the application of ultrasound, in particular the use of high-intensity acoustic energy to change materials. Ultrasonication generates alternating low-pressure and high-pressure waves in liquids (compression and rarefaction), leading to the formation and violent collapse of small vacuum bubbles. This phenomenon is termed cavitation and causes high speed impinging liquid jets and strong hydrodynamic shear-forces.

Ultrasound is cyclic sound pressure with a frequency greater than approximately 20 kilohertz (20,000 Hertz), In this specification hydrothermal conditions (also hydrothermal synthesis) means the various techniques of crystallizing substances from high-temperature aqueous solutions at high vapour pressures; also termed "hydrothermal method". Hydrothermal synthesis can be defined as a method of synthesis of single crystals that depends on the solubility of minerals in hot water under pressure, preferably higher than atmospheric pressure. The crystal growth is often performed in an apparatus consisting of a steel pressure vessel (autoclave), in which a nutrient is supplied along with water. Typical hydrothermal conditions may include periods of incubation, for example, one day, two days, three days, four days or longer at ambient conditions.

Advantages of the present invention include:
The economic and environmental benefits associated with direct sonocrystallisation of zeolites from non-fused fly ash to obtain zeolite can be expected to trigger research interest at larger scale than the bench scale level hence stimulating more beneficial fly ash utilization in order to minimize disposal costs, reap financial gains generated from the sale of products obtained and also as a replacement of some of the expensive and scarce natural resources and It is expected that predetermined zeolites can be made by using the well known molar regimes of the starting synthesis feedstocks through direct application of ultrasound. These zeolites might have increased value in the market.

DESCRIPTION OF THE FIGURES

The invention will now be described with reference to the following Figures in which:

FIG. 1 shows a study of the effect of NaOH concentration on dissolution behaviour of Si and Al from the as-received fly ash after sonication for 10 minutes, FIG. 2 shows a study of the effect of sonication time (5, 10, 15 and 30 min) on dissolution behaviour of Si and Al from the as-received fly ash; NaOH concentration was held at 5 M, FIG. 3 shows a study of the effect of magnetic stirring during sonication fly ash-NaOH slurry on the dissolution behaviour of Si and Al from the as-received fly ash; mixture was sonicated for 10 minutes and NaOH concentration was held at 5 M, FIG. 4 shows a study of the effect of fly ash particle size on dissolution behaviour of Si and Al from the as-received fly ash after sonication for 10 minutes with NaOH concentration kept constant at 5 M, FIG. 5 shows SEM image of the raw (as-received) fly ash, FIG. 6 shows SEM image of synthesis product obtained when the as-received fly ash was sonicated for 5 minutes, FIG. 7 shows SEM image of synthesis product obtained when the as-received fly ash was sonicated for 10 minutes, FIG. 8 shows SEM image of synthesis product obtained when the as-received fly ash was sonicated for 15 minutes, FIG. 9 shows SEM image of synthesis product obtained when the as-received fly ash was sonicated for 30 minutes, FIG. 10 shows X-ray diffraction pattern of raw fly ash compared with ultrasonic assisted synthesis products obtained by variation of sonication time from 5 to 30 minutes (Can=hydroxyl cancrinite, Sod=hydroxyl sodalite, Q=quartz, M=Mullite, H=Hematite), FIG. 11 shows X-ray diffraction pattern of raw Arnot fly ash compared with 30 minutes sonicated fly ash and hydrothermally (HT) treated (after 30 minutes of sonication) fly ash slurry (Can=hydroxyl cancrinite, P=zeolite Na—P1, Q=quartz, M=Mullite, H=Hematite), FIG. 12 shows SEM image of the synthesis product obtained when the already sonicated (30 minutes) as-received fly ash that was shown in FIG. 9 was further subjected to hydrothermal treatment at 140° C. for 48 hours.

FIG. 13 is an image showing a cancrinite cage (reference, IZA, 2010),

FIG. 14 is a structure projection of cancrinite zeolite seen at [001] (reference, IZA, 2010).

FIG. 15: shows comparative FTIR spectra generated when the as-received fly ash was sonicated at different times (5, 10, 15 and 30 minutes) together with that generated when the already sonicated (30 minutes) fly ash was further subjected to hydrothermal treatment at 140° C. for 48 hours, and FIG. 16 shows N2 adsorption—desorption isotherm for zeolitic product synthesised by varying the sonication time (5-30 minutes).

DETAILED DESCRIPTION

Materials and Instruments Used

A sample of Class F fly ash was collected from one of South African's power plants. This fly ash had the typical mineralogical and chemical composition of a class F fly ash. An Omni Sonic Ruptor 400 Ultrasonic Homogenizer (400 Watt maximum Power, 20 kHz system) was used. The instrument has the capability of processing samples ranging from 025 to 1000 ml. It is important to highlight that the instrument has the following features:

variable power supply,
auto-tuning for optimal processing efficiency,
power-emitted display for accuracy and repeatability,
0-15 minute timer,
tips compatible with most 20 kHz systems, and
pulse mode for sensitive samples.

Methodology 100 ml of predetermined concentrations of NaOH were prepared for each experiment were mixed with 20 g of fly ash in a 100 ml graduated plastic beaker. The sample was placed on the sample platform of the Omni Sonic Ruptor 400 Ultrasonic Homogenizer and approximately 3 cm of the standard processing tip was inserted in the solution. Thereafter, the power was adjusted to 100% and the pulse control was set to read 100% in order to limit temperature raise since the power was set to the maximum.

The sonication was conducted at ambient conditions, i.e. sea level pressure and a temperature range of from 18 to 25 deg C.

During the investigation of the effect of NaOH concentration, four concentrations (1M, 3M, 4M and 7M) were studied by fixing the sonication time to 10 minutes.

Effect of sonication time was investigated by fixing NaOH concentration at 5M and the sonication time was varied as follows; 5, 10, 15 and 30 minutes. In order to study the effect of fly ash particle size (90 μm, 150 μm and 212 μm), 5M NaOH and 10 minutes sonication time were fixed.

The effect of stirring the fly ash-NaOH mixture was investigated by fixing NaOH concentration at 5M and sonicating it for 10 minutes. It is important to highlight that stirring and sonication were done simultaneously. Instead of placing the sample on the instrument's sample platform, the sample was placed on a magnetic stirrer and a magnetic stirring rod was dropped in the slurry.

After each synthesis, the resulting slurry was centrifuged and filtered using 0.2-μm membrane filters in order to remove any remainder of the undissolved fly ash in the supernatant solutions while allowing soluble silicates of monomeric, oligomeric and up to colloidal size polysilicates to pass through. This study did not differentiate the speciation of soluble silicates in the supernatant solutions.

The solid synthetic products were later washed with ultra pure water to remove loosely-bound surface alkalis. Thereafter the solids were dried in an oven at 90 deg C. (° C.) to reduce adsorbed moisture from the samples which interferes with the sensitivity of the analysis.

Starting fly ash and resulting synthesis products were characterised using X-ray diffraction spectrometer (XRD), X-ray fluorescence spectrometer (XRD), Fourier transform infra-red spectrometer (FTIR) Scanning electron microscope and the surface area was determined using the gravimetric nitrogen Brunauer-Emmett-Teller (N2-BET) technique. Inductively-coupled plasma equipped with optical emission spectroscopy (ICP-OES) was used to determine the concentration of Si, and Al.

Effect of Ultrasound on Dissolution Behaviour of Si and Al from Fly Ash

As shown in FIG. 1, it was found that the concentration of the most important elements (Si and Al) increased when the concentration of NaOH was increased although at higher concentrations the values were noted to decrease slightly. As presented in FIG. 1, after sonication of the as-received fly ash for 10 minutes the concentration of Si in solution was seen to rapidly increase from 35 mg/L when 1 M NaOH was used up to 3331 mg/L when 4 M NaOH was used. Upon the use of 7 M NaOH, the Si concentration was found to be 3432 mg/L which was only a slight increase compared to the use of 5M NaOH. A similar trend was also observed for the case of dissolution of Al since as it was seen to rapidly increase from 64 mg/L (1 M NaOH) to 1674 mg/L (4 M NaOH) with a decrease to 1466 mg/L when 7 M NaOH was used. The dissolution of Si and Al from the as-received fly ash was found to be directly dependent on the NaOH concentration between 1 and 4 M when a fixed sonication time was applied. The concentration of the Si dissolved from fly ash was found to be higher than that of Al, as expected, since the content of $SiO_2$ in the fly ash is normally higher than that of $Al_2O_3$.

The effect of sonication time on release of Si and Al from fly ash upon sonication is shown in FIG. 2. From the results presented in FIG. 2, the concentration of Si was increased from 358 mg/L when the as-received South African class F fly ash was sonicated for 5 minutes to 1385 mg/L after 10 minutes of sonication. A decline in the Si concentration (547 mg/L) was observed occur after 15 minutes of sonication which was followed by a very rapid increase up to 9708 mg/L after 30 of sonication. A similar trend was also observed in the Al concentration which was 218 mg/L after 5 minutes sonication and increased to 2890 mg/L after sonication for 30 minutes with a similar concentration decrease (320 mg/L) after 15 minutes of sonication. Previous studies by Luque de Castro and Priego-Capote (2007b) pointed out that ultrasound irradiation of solid particles suspended in a liquid phase enhances their dissolution mainly due to the induced mechanical effects. The mechanical disaggregation and breakdown of fly ash particles as well as the glassy amorphous materials phase resulted in enhanced dissolution.

It was expected that the stirring during sonication could enhance dissolution of the fly ash mineral phases but it turned out to be the opposite (FIG. 3). From the results presented in FIG. 3, sonication of fly ash for 10 minutes without the additional magnetic stirring led to dissolution (358 mg/L of Si and 218 mg/L of Al) but with the additional stirring, the Si concentration was observed to decrease to 250 mg/L whereas that of Al decreased to 162 mg/L. A similar trend was also observed when the fly ash-NaOH slurry was sonicated for 10 minutes. This decrease in the dissolution of Si and Al upon additional magnetic stirring could be due to the interruption of the microstreaming and microjetting effects which are thought to be the main contributors of the mechanical effects affecting dissolution of fly ash.

Previous studies have pointed out that ultrasound irradiation on solid particles suspended in a liquid phase enhanced their dissolution mainly due to the induced mechanical effects. The cavitation mechanism at or near particle surface leads to the generation of a liquid jet that results to collisions of particles inducing shearing to form smooth or pitted particle surfaces with a decreased size. The generated liquid jet can either be through microjetting and microstreaming. Both microstreaming and microjetting effects contribute to mechanical disaggregation of aggregated particles which results in the dispersion of loosely held clusters and hence enhances dissolution.

The dissolution of Si and Al from fly ash was found to increase with the decrease of fly ash particle size (FIG. 4). From the results presented in FIG. 4, the concentration of Si obtained from sonicating fly ash having 90 µm, 150 µm and 212 µm particle sizes was found to be 2985 mg/L, 2073 mg/L and 1933 mg/L respectively while that for Al was 2985 mg/L, 2073 mg/L and 1933 mg/L respectively. The trend shows that the concentration of Si and Al decreased with the increase of fly ash particle size which was understandable since the smaller fly ash particles had earlier been reported to contain less quartz (Muriithi et al., 2011) and dissolved much easier upon sonication. The high surface area of the smallest particles is also thought to have enhanced the mechanical effects emanating from the cavitation phenomenon of ultrasonication as expected.

Morphological Studies of Raw and Sonicated Fly Ash

The SEM images of raw and sonicated fly ash are presented in FIGS. 2-9 and 12. As expected, the fly ash particles were spherical and smooth due to the amorphous glassy phase (FIG. 5). When the fly ash was sonicated for 5 to 15 minutes, the particles lost their smooth surface and became uneven due to the mechanical effects (shear forces, jet and shock waves) induced by the cavitation process which result in rapid mass transfer, surface cleaning and particle size reduction (FIGS. 5-8). Sonicating the fly ash for 30 minutes (FIG. 9) led to the formation of secondary crystals which were identified to be an almost pure hydroxy-cancrinite zeolite phase. When the already sonicated (30 minutes) South African class F fly ash was further subjected to hydrothermal treatment at 140° C. for 48 hours, zeolite P and amorphous material that had been identified from the XRD pattern presented in FIG. 11 were also observed in the SEM image in FIG. 12. This zeolitic transformation is thought to be due to the Ostwald's step rule on the law of successive phase transformations (Byrappa and Yoshimura, 2001).

The exact mechanism for zeolite sonocrystallisation is not yet properly understood but the extreme conditions inside the medium brought about by the cavitation phenomenon has been reported to accelerate nucleation and crystallization rates. The increase in the degree of supersaturation achieved upon the application of ultrasound has been proposed to trigger the formation of germ nuclei that are distributed through the solution by the collapse of the bubble which nuclei grow to form the crystalline material by incorporation of the building block silicate species generated during the dissolution step.

XRD Analysis

XRD analysis results for experiments conducted to investigate the effect of sonication time are presented in FIG. 10. The samples obtained were subjected to a complete set of characterization techniques that is normally conducted for samples generated through the other well-known synthetic routes.

As shown in FIG. 10, sonicating fly ash for 5, 10 and 15 minutes resulted in production of a mixture of hydroxyl cancrinite and hydroxyl sodafite zeolite phases. When sonication was extended to 30 minutes, an almost pure hydroxyl cancrinite zeolite phase was obtained. FIG. 11 compares the product obtained after hydrothermal treatment of the already sonicated fly ash (30 minutes) with that only sonicated for 30 minutes.

It was interesting to note that further hydrothermal treatment of the sonicated fly ash slurry resulted in the formation of another zeolite phase (Zeolite Na-P1) which in this case could be referred to as a contaminant because the hydroxyl cancrinite zeolite obtained by sonicating fly ash for 30 minutes was almost in its pure form. Amorphous material was also identified by the 'hump' in the XRD diffraction pattern appearing between 20-40' 2θ.

Cancrinite zeolites belong to the abc family of zeolites of which sodalite, chabazite, and offretite are also members. Cancrinite has one-dimensional, 12-membered ring pores that are about 5.9 Å in diameter (see FIGS. 13 and 14). A mixture containing sodalite and/or cancrinite cages in which salts are encapsulated have been shown to possess a wide range of applications which in most cases depend on the nature of the salts encapsulated. Cancrinite zeolites can be used as a source of soil nutrients for instance by slowly releasing phosphates and nitrates during weathering. They can also be used to release oxygen gently to the soil if the trapped salts are perchlorates, chlorates or chromates. They can also serve as single or dual function catalysts such as in hydrogenation-dehydrogenation catalysis where the encapsulated salts are those of the Group VIb metals, converted to their oxide form.

There is a lack of studies on further applications of cancrinites due to the problems of the preparation of large amounts of its pure-phase hence the newly developed method could excite more interest in this direction.

FTIR Analyses of the Sonicated Fly Ash

FTIR analysis is a well known complementing characterisation technique that enables the monitoring of evolution of crystallinity during zeolite synthesis and also provides information about molecular structure.

FIG. 15 shows the FTIR spectrum of Arnot fly ash and compares it with the spectra generated when the same non-fused fly ash was sonicated at different times using the Omni Sonic Ruptor 400 Ultrasonic Homogenizer.

The spectrum for the raw fly ash (Arnot) presented in FIG. 15 showed the expected three wide bands characteristic of aluminosilicates: the band at 460 cm$^{-1}$ (T-O bending vibrations), bands at around 704, 780 and 800 cm$^{-1}$ (T-O symmetric stretching vibrations, where T is either Al, Si) and band at 1053 cm$^{-1}$ (T-O asymmetric stretching vibrations). The band at around 950 cm$^{-1}$ was associated with the presence of a glassy phase while the bands found at 550, 560, and 700 cm$^{-1}$ are reported to be due to the mullite phase in the fly ash. The FTIR spectra of the sonicated alkaline activated fly ash samples show interesting differences when compared with the spectrum of fly ash. The bands in the region of 400-420 cm$^{-1}$ are related to the pore opening or motion of the tetrahedral rings, which form the pore opening of zeolites while the bands in the region of 420-500 cm$^{-1}$ are attributed to internal tetrahedron vibrations of Si—O and Al—O of the zeolitic materials. The band at around 1053 cm$^{-1}$ in the original fly ash became the sharpest when the fly ash was sonicated for 30 minutes meaning that most of the fly ash amorphous glassy phase had been converted to zeolites.

Comparing the mid-Infrared vibrational bands of the ultrasonic assisted synthesis products obtained after 30 minutes sonication of the as-received South African class F fly ash with that obtained after the same sample was further subjected to hydrothermal treatment at 140° C. for 48 hours, the partial transformation of hydroxy-cancrinite to zeolite P is evident from the significant shift of the peak appearing at 938 cm$^{-1}$. This shift is due to the differences of the Si/Al ratio between zeolite P and cancrinite zeolite. The shift caused by differences in Si/Al ratio has also been affirmed by Flanigen (1971) in the case where dealumination of zeolites was conducted. Though there are some noticeable differences in the intensity of the peaks in the spectra for the single phase hydroxy-cancrinite with that of the mixture of hydroxy-cancrinite with zeolite P and amorphous material, it is important to point out that the joint presence of T-O vibrations (T=Al, Si) in both samples yields overlapping spectral bands that make interpretation difficult. This challenge was also affirmed by Fernandez-Jimenez and Palomo (2005).

BET Results

Brunauer-Emmett-Teller (N$_2$-BET) analysis is an important physical characterisation tool that is used to understand the surface area, micro-pore area and micro-pore volume of the synthesised product. Table 1 presents the surface area, micro-pore area and micro-pore volume results obtained when non-fused Arnot fly was sonicated at different times.

TABLE 1

Surface area, micro-pore area and micro-pore volume of the zeolite synthesised by sonicating non fused Arnot fly ash.

| Period of sonication (minutes) | BET surface area (m$^2$/g) | Micro pore area (m$^2$/g) | Micro pore volume (cm$^3$/g) |
|---|---|---|---|
| 0 (Raw Arnot fly ash) | 2.7872 | 0.19141 | 0.0017 |
| 5 | 35.1422 | 9.5 | 0.0039 |
| 10 | 41.9504 | 7.9367 | 0.0033 |
| 15 | 41.7197 | 9.5392 | 0.0039 |
| 30 | 42.043 | 6.2239 | 0.0026 |

From Table 1, it can be seen that there was a significant increase in the product's surface area as the sonication time was increased. The growth of the zeolitic crystals as shown in the SEM images and confirmed by the XRD analysis was attributed to the increase of the surface area due to the porosity of zeolites compared to the fly ash. The nitrogen adsorption/desorption isotherms are shown in FIG. 16.

The nitrogen adsorption/desorption isotherm did not have the expected type 1 isotherm known for the microporosity property. The BET surface area was also noted to be lower than expected. The reason could be due to the channel dimensions of hydroxyl cancrinite which are occupied by Na and other charge balancing cations hence limiting the adsorption of nitrogen inside the pores. The observed hysteresis loop revealed some intragranular mesoporosity of the zeolite.

REFERENCES

Aki, I. and Ari, V. (2007) Analytica Chimica Acta. 602: 195-201.

Ashokkumar, M., Lee, J., Kentish, S. and Grieser, F. (2007) Ultrasonics Sonochemistry. 14: 470-475.

Belova, V., Andreeva, D. V., Mahwald, H. and Shchukin, D. G. (2009) Journal of Physical Chemistry. 113: 5381-5389.

Belviso C., Cavalcante F., Lettino A. and Fiore S. (2011) Ultrasonics Sonochemistry. 18: 661-668.

Dolores, M., Castro, L. and Priego-Capote, F. (2007) Trends in Analytical Chemistry. 26 (2).

Enomoto, N., Koyano, T. and Nakawa, Z. (1996) Ultrasonics Sonochemistry. 3: 105-109.

Feng, D., Tan, H. and Van Deventer, J. S. J. (2004) Journal of Materials Science. 39: 571-580.

Jianmei, W., Baoyu, W., Niu, L. and Shouhe, X. (2006) Chinese Journal of Catalysis. 27 (5).

Leviila, I., Vilas, P., Mikis, J. and Bendicho, C. (2006) Analytica Chimica Acta. 577: 119-125.

Lindley, J. (1992) Ultrasonics. 30 (3): 163-167.

Luque de Castro, M. D. and Priego-Capote F. (2007b) Ultrasonics Sonochemistry. 14: 717-724.

Mason, T. J. (1997) Oxford University press, New York.

Michel H. (2001) Talanta. 54: 1021-1038

Suslick, K. S. (1998) Fourth edition, vol. 26; John Wiley and Sons Inc, New York, pp. 516-541.

Oziem, A., Melkon, T., Ahmet, S., Isik, E. and Ayser, E. (2005) Microporous and Mesoporous Materials. 79: 225-233.

Priego-Capote, F. and Luque de Castro, M. D. (2007a) Journal of Biochemical and Biophysical Methods. 70: 299-310.

Run, M., Wu, S. and Wu, G. (2004) Microporous and Mesoporous Materials. 74: 37-47.

Byrappa, K. and Yoshimura, M. (2001), Noyes Publications/William Andrew Publishing, LLC, New York.

Fernandez-Jiménez A. & Palomo A., (2005), Microporous and Mesoporous Materials. 86: 207-214.

Flanigen, E. M., Khatami, H. and Szymanski, H. A. (1971), Advances in Chemistry Series. 101: 201.

Muriithi, G. N., Gitari, W. M., Petrik, L. F. and Ndungu, P. G. (2011), Journal of Environmental Management. 92: 655-664.

The invention claimed is:

1. A method for the preparation of zeolites from non-fused fly ash, the method comprising the steps of preparing an aqueous alkali hydroxyl solution, mixing the solution with the non-fused fly ash to create an aqueous alkali hydroxyl fly ash mixture, subjecting the mixture to direct ultrasonication, and recovering the zeolites, wherein said method does not comprise an additional hydrothermal process step and wherein the direct ultrasonication is conducted at between 18° C. and 25° C.

2. A method according to claim 1 including the step of centrifuging and/or filtering the mixture after ultrasonication.

3. A method of claim 1 further comprising the step of washing the zeolites and thereafter drying the zeolites.

4. A method according to claim 1, wherein the method takes place at atmospheric pressure.

5. A method according to claim 1, wherein the aqueous alkali hydroxyl concentration of the solution is from 0.5M to 10M.

6. A method according to claim 1, wherein the aqueous alkali hydroxyl solution is an aqueous sodium hydroxide solution.

7. A method according to claim 1, wherein the aqueous alkali hydroxyl solution includes tap water, distilled water, deionised water, brine and/or mine water.

8. A method according to claim 1, wherein the solid to liquid mass ratio of fly ash to aqueous alkali hydroxyl solution in the mixture is from 1:1 to 1:20.

9. A method according to claim 1, wherein the mixture is subject to ultrasonication for between 2 minutes and 45 minutes.

10. A method according to claim 1, wherein the mixture is agitated for a least a portion of the time whilst being subject to ultrasonication.

11. A method according to claim 1, wherein the fly ash has an aggregate particle size of between 50 and 300 µm.

12. A method according to claim 1, wherein the ultrasonication is applied directly to the mixture.

13. A method according to claim 1, wherein the utrasonication is more than 400 Watts of power.

\* \* \* \* \*